United States Patent
De Doncker (10) Patent No.: US 10,873,254 B2
(45) Date of Patent: Dec. 22, 2020

(54) ELECTRICAL CIRCUIT FOR ZERO-VOLTAGE SOFT-SWITCHING IN DC-DC CONVERTER UNDER ALL LOAD CONDITIONS

(71) Applicant: Rheinisch-Westfälische Technische Hochschule (RWTH) Aachen, Aachen (DE)

(72) Inventor: Rik W. De Doncker, Leuven (BE)

(73) Assignee: Rheinisch-Westfälische Technische Hochschule (RWTH) Aachen, Aachen (DE)

( * ) Notice: Subject to any disclaimer, the term of this patent is extended or adjusted under 35 U.S.C. 154(b) by 0 days.

(21) Appl. No.: 16/456,219

(22) Filed: Jun. 28, 2019

(65) Prior Publication Data
US 2020/0007030 A1    Jan. 2, 2020

(30) Foreign Application Priority Data

Jun. 29, 2018    (DE) .......................... 10 2018 210 807

(51) Int. Cl.
*H02M 3/335* (2006.01)
*H02M 1/34* (2007.01)
*H02M 1/00* (2006.01)

(52) U.S. Cl.
CPC ......... *H02M 1/34* (2013.01); *H02M 3/33507* (2013.01); *H02M 3/33592* (2013.01); *H02M 2001/0048* (2013.01)

(58) Field of Classification Search
None
See application file for complete search history.

(56) References Cited

U.S. PATENT DOCUMENTS

| | | | |
|---|---|---|---|
| 5,027,264 A | 6/1991 | DeDonoker et al. | |
| 5,949,669 A | 9/1999 | Bruckmann et al. | |
| 7,126,833 B2 | 10/2006 | Peng | |
| 9,487,098 B2 | 11/2016 | Yamada et al. | |
| 2006/0109694 A1 | 5/2006 | Peng | |
| 2015/0256089 A1 | 9/2015 | Yamada et al. | |
| 2020/0007022 A1* | 1/2020 | De Doncker | ....... H02M 3/3376 |

FOREIGN PATENT DOCUMENTS

DE    19536470 A1    4/1997

* cited by examiner

*Primary Examiner* — Jeffrey A Gblende
(74) *Attorney, Agent, or Firm* — The Webb Law Firm (57) ABSTRACT

An electrical circuit comprising an n-port m-phase active bridge converter with n≥2 and m≥3, where each port can be operated as an input or an output port, wherein each of the n ports has m phase legs with multiple active switches with parallel connected snubber or resonant capacitors, whereby the ports can convert a DC-voltage into an AC voltage and vice versa, whereby the ports are connected via a m-phase transformer or over m separate transformers each connected to each of the m phase legs of each of the m ports to transfer power between the ports, wherein an auxiliary circuit is connected to a star point of the transformers to feedback a fraction of a transformer input voltage and energy into a DC mid-point capacitor of a DC-link of at least one of the n-port m-phase active bridge converters to charge the DC mid-point capacitor.

15 Claims, 4 Drawing Sheets

ELECTRICAL CIRCUIT FOR ZERO-VOLTAGE SOFT-SWITCHING IN DC-DC CONVERTER UNDER ALL LOAD CONDITIONS

CROSS-REFERENCE TO RELATED APPLICATION

This application claims priority to German Patent Application No. 10 2018 210 807.2 filed Jun. 29, 2018, the disclosure of which is hereby incorporated by reference in its entirety.

FIELD OF INVENTION

The invention relates to an electrical circuit comprising an n-port m-phase multi-directional active bridge DC-DC converter and an auxiliary circuit to at least reduce losses during commutation processes without involving a boost current to allow zero-voltage soft-switching of the multi-directional active bridge DC-DC converter under all operating conditions and to a corresponding method.

BACKGROUND OF THE INVENTION

A DC-DC converter, also known as a power converter, refers to an electric circuit that converts a direct current or voltage fed to the input side into a direct current or voltage having a higher, lower or inverted voltage level. DC-DC converters can be found, among others, not only in switched-mode power supply units of PC power supply packs, notebooks, mobile phones and HiFi devices, but also as voltage conditioners in motor drive systems, maximum power point (MPP) trackers in PV installations and battery chargers Their advantages in comparison to linear power supply units are their higher efficiency and lower heat generation. In a linear voltage regulator or in a series resistor, in contrast, the superfluous voltage simply "burns off".

DC-DC converters are also available as completely encapsulated converter modules that are sometimes intended for direct insertion into printed circuit boards. The output voltage can be lower than, equal to or greater than the input voltage, depending on the model. The best-known modules are the ones that transform a low voltage into a galvanically isolated extra-low voltage. The encapsulated DC-DC converters are available, for example, for insulation voltages ranging from 1.5 kV to over 3 kV, and they serve to supply power to small consumers in direct-voltage networks such as, for example, 24 V in industrial installations or 48 V in telecommunications or in the realm of electronic modules such as, for instance, 5 V for digital circuits or ±15 V for the operation of operational amplifiers. DC-DC converters can also be found in high-power applications, such as automotive and traction. In automotive applications, for example, they serve to charge batteries or to supply power from the batteries or fuel cells to the dc-link of the traction inverter and the on-board low-voltage power supply. DC-DC converters are classified according to various criteria and divided into many different topologies (such a hard-switched, resonant, transition resonant, galvanic isolated, unidirectional, multi-phase, etc. types). In contrast to unidirectional converters, when it comes to bidirectional, or multidirectional, multi-port DC-DC converters, it may be immaterial which terminal(s) is defined as the input and which terminal(s) is defined as the output. A bidirectional energy flow allows power to flow from the defined input (primary side) towards the output (secondary side) and vice versa. In the case of multi-port active bridge converters, the ports are not called primary or secondary side, but are instead numbered, e.g. port 1, port 2, port 3 etc.

In DC-DC converters that are based on the functional principle of a bidirectional two-port active bridge converter, the so-called dual active bridge (DAB) topology, the DC input voltage is converted by an input converter into an AC voltage, which is then fed to a transformer or inductor(s). Transformers are used to provide galvanic isolation between the DC ports. The output of the transformer is connected to an output converter that once again converts the AC voltage into a DC output voltage for a load. These DC-DC converters can be implemented in single-phase or multi-phase configurations. Such DAB DC-DC converter topologies as disclosed, for example, in U.S. Pat. No. 5,027,264, constitute high-efficiency converter topologies that allow a bidirectional energy flow and galvanic separation via the transformer and operation at high voltages. This type of converter is particularly well suited for use in high-power DC networks, e.g. medium-voltage and low-voltage DC grids and DC collectors for windfarms and large PV installations. Since the transferred power in medium and low-voltage grids is not constant, the need of power flow control and a variable voltage ratio arises. The DAB has the highest efficiency while operating in zero-voltage soft-switching (ZVS) mode under high-power conditions. At low-power operation however, the soft-switching boundary can be violated. To exploit fully renewable energy sources under all weather conditions, operation of the DC-DC converter under every load condition at high-efficiency is needed.

The three-phase DAB DC-DC converter may include at least two actively switched three-phase bridges (phase legs) linked by a three-phase transformer, which may be connected in a star-star (Y-Y) configuration. In order to operate under zero-voltage soft-switching (ZVS) conditions, snubber or resonant capacitors can be placed across the semiconductor devices. However, when the DAB is operating under partial load conditions the magnetically stored energy in the transformer inductance may not be sufficient to fully commutate the voltage of the capacitors. Hard-switching events also occur when the load current remains freewheeling in a diode prior to switching off the anti-parallel active switch while turning on the other switch in the inverter phase leg. The semiconductor devices can even be destroyed when the energy stored in the capacitors is discharged in the devices during the hard-switched turn-on process. To improve the commutation process auxiliary circuits can be implemented to provide a boost current that ensures full commutation of the capacitor voltages. However, auxiliary circuits in the state of the art not only have to commutate the current from the diode to the active switch and provide a boost current to commutate the capacitor voltage but also need to compensate their losses. Therefore, the boost current needs to be accurately controlled and measured to guarantee safe ZVS operation. Hence, the state of the art circuits require fast switches, high-bandwidth and precise boost current control, which makes said circuitry very expensive.

Therefore, it is desirable to provide means for a DC-DC converter to operate in zero-voltage soft-switching (ZVS) mode under all load conditions and to overcome the disadvantages of the state of the art.

SUMMARY OF THE INVENTION

It is an objective of the invention to provide a means for an n-port m-phase active bridge DC-DC converter to reduce losses during the commutation process to allow zero-voltage soft-switching without using a boost current.

This objective is solved by an electrical circuit for zero-voltage switching of a DC-DC converter under all load conditions comprising an n-port m-phase active bridge converter with n≥2 and m≥3, where each port can be operated as an input or an output port, wherein each of the n ports has m phase legs with multiple active switches with parallel connected snubber or resonant capacitors, whereby the ports can convert a DC-voltage into an AC voltage and vice versa, whereby the ports are connected via a m-phase transformer or over m separate transformers each connected to each of the m phase legs of each of the n ports to transfer power between the ports, wherein an auxiliary circuit is connected to a star point of the transformers to feed back a fraction of a transformer input voltage and energy into a DC mid-point capacitor of a DC-link of at least one of the n-port m-phase active bridge converters in such a way that the DC mid-point capacitor is charged at its port with an offset voltage above and below the DC-link midpoint voltage enabling the auxiliary circuit to provide under all load conditions zero-voltage soft-switching operation of the switches of the converter phase legs. The term zero-voltage switching (ZVS) and the term zero-voltage soft-switching can be used interchangeably hereafter.

A multidirectional n-port m-phase active bridge converter has n number of ports with m number of phases in each port, where n, m⊆N. Said converter is commonly known in its two-port m-phase form, which is also called Dual Active Bridge converter, short DAB converter. For an n-port active bridge converter, where n>2, the term "multiport active bridge DC-DC converter", short "MAB converter", and "multiport DAB converter" are used interchangeably. When power is transferred in a MAB converter topology, at least one of the ports converts a DC input voltage into an AC input voltage as input port/s and at least one of the other ports converts an AC output voltage into a DC output voltage as output port/s. But in general terms, every port can convert a DC voltage into an AC voltage and every port can have bidirectional power flow. In standby conditions, when the transferred power is zero between the ports, all the ports convert a DC voltage into an AC voltage that generates only reactive power in the transformer.

For DAB converters, the primary side typically refers to the input port of the DC-DC converter. In a corresponding manner, the secondary side refers to the other side of the transformer that is connected to the output port. If the primary and secondary sides are insulated from each other, their respective ports are connected via a transformer. Non-isolated variants can be realized using inductors or auto-transformers between primary and secondary ports. If the DAB converter is configured so as to be bidirectional, then the power can be either transferred from the primary side to the secondary side or vice versa. The DC-DC converter according to the present invention can be configured as a multi-phase DAB converter with m phases, which can be configured as a single phase, three-phase or five-phase etc. DAB or multi-port active bridge (MAB) converter.

The number of phases m determines the minimum number of so-called inverter phase legs inside a port. A three-phase DAB has at least three phase legs inside one port, where in case of more than three phase legs, some phase legs are switched in parallel to provide three effective phases. Each phase leg has active switches in two-level or multi-level configuration. By switching the active switches (switching operation with a switching pattern) a DC input voltage can be converted into an AC input voltage to the transformer. Vice versa an AC output voltage can be converted into a DC output voltage. As a rule, the power semiconductor switches in each phase leg are complementary turned on or off. Hence, in case of two-level converter phase legs, the alternating voltages that are formed at the transformer have approximately the shape of a square-wave (square-wave voltage). In case of multi-level converters, multi-step waveforms are created. As a result, the voltage over the transformer windings becomes stepped. "Snubbers" or snubber capacitors, ensure that the edges of the square-wave voltage are not infinitely steep, which means that the form deviates from that of a square-wave voltage (stepped form at the transformer windings). Snubbers are employed to ensure a dynamic voltage balancing of series connected switches during switching operations (snubber network). The term "snubber network" refers to an electric circuit having snubber elements that, in the case of an abrupt interruption of the current flow, are meant to neutralize, for example, high-frequency interference or voltage spikes that usually occur when inductive loads are switched. In general, snubber elements limit the rate of voltage rise or the rate of current rise on semiconductors. For example, capacitive snubbers provide zero-voltage switching during turn-off of the power semiconductors, thereby reducing switching losses. In the present invention snubbers are referred to as "snubber or resonant capacitors", as the snubber capacitors can also be operated in resonant mode, especially when forming a resonant circuit with the auxiliary inductances of the auxiliary circuit.

Depending on the configuration, two or more active switches per phase leg can be employed. Suitable switches for the phase legs are active semiconductors (power semiconductors) such as, for example, gate turn-off thyristors, transistors, MOSFETs, IGBTs (insulated gate bipolar transistors) or ICGTs (integrated gate-commuted thyristor). As an alternative, the person skilled in the art can also employ other suitable active switches.

Omitting snubbers would increase the turn-off switching losses significantly. Also, in practice, Gate turn-off Thyristors (GTOs and GCTs) require in any case additional turn-on snubbers to protect the main power diodes.

The term "transformer" as set forth here refers to the magnetic circuit—usually a ferrite or iron core—with the appertaining windings of the primary and secondary phase legs around the magnetic core. Alternatively, also air core transformers may be used as the transformer(s). If each of the phase legs comprises a separate transformer, only the conductors of a primary phase leg and the appertaining other secondary phase leg are wound around the transformer that is associated with this phase leg. The term "multi-phase transformer" or "m-phase transformer", in contrast, refers to a transformer that has a shared magnetic core for all phase legs, whereby the windings of the phase legs of a first, second port and nth port are arranged in different areas of the magnetic core.

The function of a DC-DC converter is to bring about a systematic AC voltage drop over the leakage inductance, e.g., the so-called short circuit impedance, of the transformer and thus to control the power flow. Actively switched phase legs make it possible to independently control the load angle between the primary and secondary alternating voltages present on the transformer and thus to systematically control the power flow.

The electrical circuit can also utilize a controlling unit, which does not have to be part of the n-port m-phase active bridge converter, but can also be an external component, which is connected to the n-port m-phase active bridge converter for controlling the active switches. This is advantageous when the controller should be flexibly adapted to the given application. Such a controlling unit, which may not be an integral part of an n-port m-phase active bridge converter, can be built into an interconnected network with, for example, a separately built microcontroller, digital signal processor (DSP) or programmable logic devices, such as FPGA. These or similar devices can be connected to the switches via a power semiconductor gate driver, which is conventionally realized as a part of the power electronic converters. The controlling unit can also be integrated onto the same circuit board of the semiconductor switches via conducting paths or integrated onto external circuit boards and then connected via cables. The connection (e.g. cable) can be realized in different ways, e.g. via a printed circuit board, normal cable, coaxial cable, ribbon cable, RJ-45 cable, optical signals (e.g. optical waveguide) etc. As long as the DC-DC converter offers a connecting port for a gate driver, the controlling unit can also be realized as a control rack/controlling platform, which is connected with the DC-DC converter.

The electrical circuit utilizes an auxiliary circuit comprising inductances, capacitors and switches. The auxiliary circuit can comprise one or more single-phase diode rectifiers $D_r$ and auxiliary inductances $L_r$, two auxiliary switches $S_{aux1}$, $S_{aux2}$ per phase leg and one or more auxiliary capacitors $C_1$, $C_2$, whereby the snubber capacitors $C_{r1}$, $C_{r2}$ and the auxiliary inductance $L_r$ form a resonant circuit when one auxiliary switch $S_{aux1}$, $S_{aux2}$ is turned on, which injects an additional current into the phase legs to provide zero-voltage soft-switching under all load conditions.

An auxiliary circuit may have no single-phase diode rectifier. However, the auxiliary circuit may comprise a single-phase diode rectifier connected to the star point of the transformer and resonant inductors and auxiliary switches connected to the capacitor $C_M$. The auxiliary circuit may then feed back a fraction of the transformer input voltage $V_{DS}$ and energy into a DC mid-point capacitor $C_M$ of a DC-link to any port of the DC-DC converter. The DC-link is that point where the direct current is fed into the inverter.

In the following the two-port, three-phase bi-directional active bridge DC-DC, e.g., the so-called three-phase Dual Active Bridge (DAB) DC-DC converter is exemplary used to explain the invention.

A three-phase DAB converter has eight possible switching states. In block-mode operation only the six non-zero states (states 1 to 6) are used. Table I shows the switching states of a three-phase DAB converter and the accompanying phase voltages across the transformer windings. The voltage $v_{SM}$ between the transformer star-point and the DC-link mid-point voltage for each state is also given in Table I. It should be noted that during block-mode operation of the three-phase DAB converter, the transformer star-point voltage "jumps" up and down with respect to the DC-midpoint voltage with an amplitude equal to ⅙ of the transformer input DC voltage $V_{dc}$.

The transformer star-point is further connected to a single-phase diode rectifier $D_r$ of the auxiliary circuit, which produces a maximum DC peak-to-peak voltage of (m−2)/m $V_{DC}$ with m as the number of phases, which would be ⅓ $V_{DC}$=⅙$V_{dc}$−(−⅙ $V_{DC}$) across the mid-point capacitor $C_M$ in this case. As a result, the DC capacitors $C_1$, $C_M$ and $C_2$ each carry a voltage of ⅓$V_{DC}$. The auxiliary circuits are connected to the top and bottom terminals of $C_M$. Triggering for example auxiliary switch $S_{aux1}$ while the lower diode D is conducting will turn off diode D. At this instance a resonant circuit is formed by the auxiliary inductance $L_{r1}$ and the parallel connection of the snubber capacitors $C_{r1}$ and $C_{r2}$ of the corresponding phase leg A1. Assuming no losses, the voltage across $C_{r2}$ will oscillate to twice the voltage applied to the auxiliary inductor $L_r$, e.g., 2×⅔ $V_{DC}$. As soon as the voltage across the snubber capacitor $C_{r2}$ reaches $V_{DC}$ (e.g., when the voltage of $C_{r1}$ equals zero) the upper diode $D_1$ will clamp the voltage of the resonant circuit to the upper rail voltage. After this instance the resonant current in auxiliary inductance $L_r$ will linearly decrease to zero.

TABLE I

Switching states of a three-phase inverter, showing the transformer phase voltages $v_{iS}$ (with i = 1, 2, 3) and the star point voltage $v_{SM}$

| Switching State | $v_{10}/V_{DC}$ | $v_{20}/V_{DC}$ | $v_{30}/V_{DC}$ | $v_{SM}/N_{DC}$ |
|---|---|---|---|---|
| 0 | 0 | 0 | 0 | −1/2 |
| 1 | +2/3 | −1/3 | −1/3 | −1/6 |
| 2 | +1/3 | +1/3 | −2/3 | +1/6 |
| 3 | −1/3 | +2/3 | −1/3 | −1/6 |
| 4 | −2/3 | +1/3 | +1/3 | +1/6 |
| 5 | −1/3 | −1/3 | +2/3 | −1/6 |
| 6 | +1/3 | −2/3 | +1/3 | +1/6 |
| 7 | 0 | 0 | 0 | +1/2 |

In practice, losses will occur in the resonant circuit, which reduce the maximum voltage amplitude that can be reached. Using standard handbook formulae, the minimum quality factor $Q_{min}$ that is required to reach at least $V_{DC}$ when switching the resonant circuit from ⅔ $V_{DC}$ can be calculated:

$$Q_{min}=Z_0/R=\text{SQRT}(L_r/C_r)/R=0.5\times\text{SQRT}(1+(\pi/\ln 2)^2)\approx 2,321$$

With R the series resistance of the resonant circuit, $L_r$ resonant inductor value, $C_r=C_{r1}+C_{r2}$ the effective capacitance of the resonant circuit during commutation.

In all practical realizations of the resonant circuit, much higher quality factors (typically between 10 and 150) have been demonstrated. Consequently, a safe commutation of the DAB capacitors from one side of the DC link to the other side may be guaranteed for all practical purposes.

In one embodiment the auxiliary switch $S_{aux1}$, $S_{aux2}$ of the electrical circuit is a zero-current switching device, such as a thyristor, capable of turning on the auxiliary circuit.

In another embodiment the number of phases m of the DC-DC converter is 3. Three-phase MAB converters have many advantages. They require much smaller DC capacitors for a given voltage ripple among others. In addition, the currents in the semiconductors at turn-off are lower than in single phase MABs, which can lower switching losses significantly.

The electrical auxiliary circuit may be especially suited when the n-port m-phase active bridge converter is a two-port m-phase active bridge converter, also called dual active bridge converter. The multi-phase DAB converter allows for an interleaved operation which reduces the filter size and turn-off currents of the semiconductor devices. In another embodiment the n-port m-phase active bridge converter is a two-port three-phase active bridge converter. The two-port three-phase active bridge converter is the most common topology for m-phase DAB converters. In a three-phase DAB circuit, the fraction of the transformer input voltage feedback into the DC-link of any port is ⅓ of the DC voltage in case of three phases present. The maximum peak-to-peak voltage variation, of the star point of the transformer around the mid-point of the DC link, which corresponds to the maximum voltage across the mid-point capacitor $C_M$, for a m-phase system is (m−2)/m, where m has to be larger than 2. The maximum peak-to-peak voltage variation, of the star point of the transformer around the mid-point of the DC link, which corresponds to the maximum voltage across the mid-point capacitor $C_M$, for a m-phase system is (m−2)/m, where m has to be larger than 2.

It is possible that all n ports are connected to an auxiliary circuit to feed back a fraction of the transformer voltage into the mid-point capacitor $C_M$ of the corresponding port. This is preferably if otherwise the ports would be operating in hard-switching mode with high-loss switching devices. The opposite can be viable if one or more ports never operate in hard-switching mode and/or have low-loss switching switches.

In one embodiment, the number of phases m for the electrical circuit is larger than three. Higher number of phases enables higher power levels while reducing the size of DC Link capacitors and transformers. For example, five-phase DAB converters could offer a smaller transformer size.

In one embodiment an auxiliary zero-current switching circuit is added to the electrical circuit to commutate the snubber capacitors in the n-port m-phase active bridge converter such that the main switches can operate under zero-voltage switching conditions, greatly eliminating switching losses.

In an embodiment the auxiliary inductances are placed behind the auxiliary switches and 2 m separate inductors are used for the auxiliary circuit to spread losses in the auxiliary inductors and facilitate cooling. In two-level converter topologies, each phase can have two inductors.

The objective of the present invention is also solved by a method of operating an electrical circuit (100) comprising an n-port m-phase active bridge converter with n≥2 and m≥3, where each port can be operated as an input or an output port, wherein each of the n ports has m phase legs with multiple active switches with parallel connected snubber or resonant capacitors, whereby the ports can convert a DC-voltage into an AC voltage and vice versa, whereby the ports are connected via a m-phase transformer or over separate m single-phase transformers each connected to each of the m phase legs of each of the ports to transfer power between the ports, the method comprising:
feeding back a fraction of a transformer input voltage into a mid-point capacitor $C_M$ of a DC-link of at least one of the ports of the n-port m-phase active bridge converter via an auxiliary rectifier circuit connected to a star point of the transformers; and
providing zero-voltage soft-switching of the switches of the phase legs at zero voltage under all load conditions.

The invention works well even when an even number of phases is connected to the upper and lower (positive and negative) rail voltage of the DC link, as long as the converter switches an uneven number of phase to one of the DC rails, the star point of the transformer voltage will move above or below the mid-point DC voltage.

In another embodiment of the method, the n-port m-phase active bridge converter is a two-port m-phase active bridge converter, also called dual active bridge converter. As mentioned before, the three-phase converter reduces the size of DC filter capacitors and the peak turn-off currents of the semiconductor devices. Moreover, the control methods and power electronics building blocks are well developed for three-phase systems. Additionally, the n-port m-phase active bridge converter can be a two-port, three-port or quad-port three-phase active bridge converter.

In another embodiment the n-port, m-phase active bridge converter uses in one or multiple ports an m-phase three-level converter. The mid-point DC voltage is needed to create the extra zero-voltage state at the output of this converter. The auxiliary circuit can be applied in the three-level converter by splitting the capacitor $C_M$ in two series connected capacitors above and below the mid-point of the DC link.

Additional advantages, special features and practical refinements of the invention ensue from the subordinate claims and from the presentation below of preferred embodiments making reference to the drawings.

BRIEF DESCRIPTION OF THE DRAWINGS

These and other aspects of the invention are disclosed in detail in the drawings as following.

DETAILED DESCRIPTION OF THE EMBODIMENTS

Figure 1:
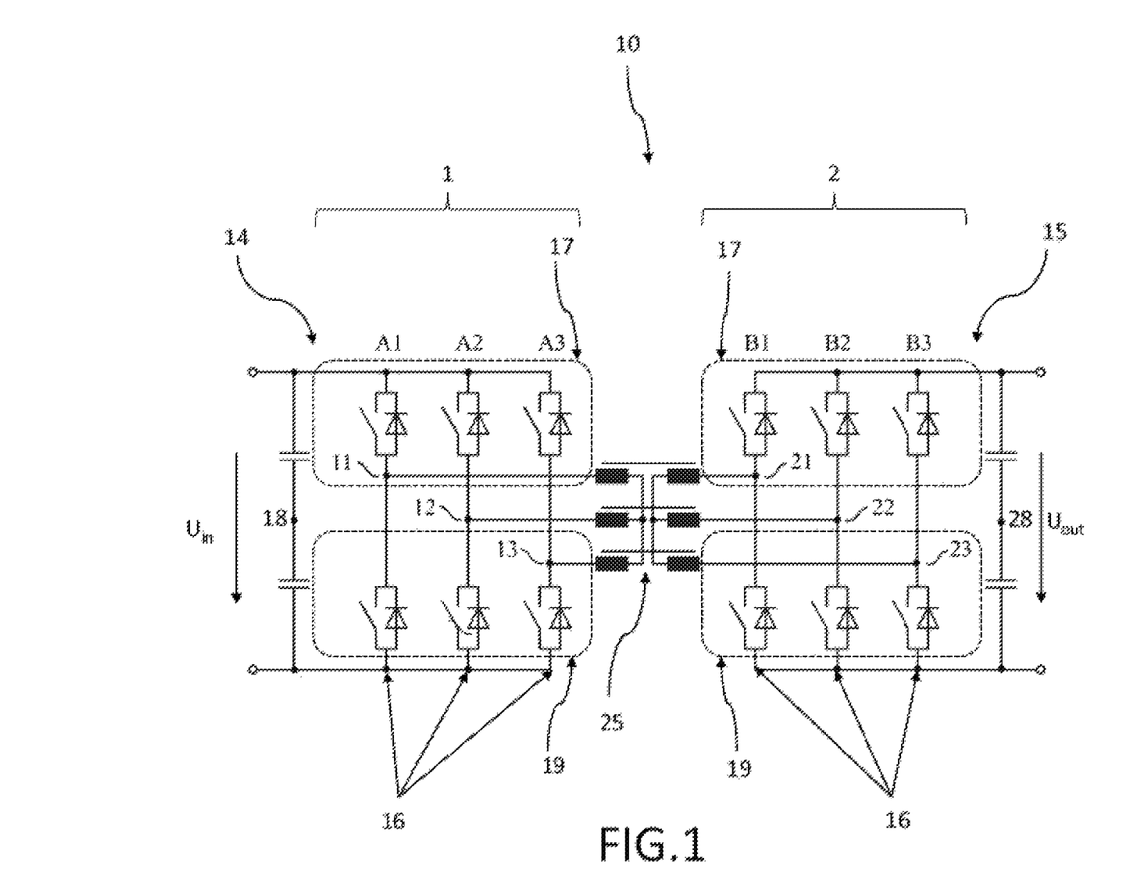
FIG. 1 shows a schematic view of a two-port three-phase active bridge converter, e.g., DAB.

FIG. 1 shows a schematic view of an n-port m-phase active bridge converter with n=2 and m=3, which is also called a three-phase Dual Active Bridge (DAB) converter. The general n-port m-phase active bridge converter 10 has a number of arbitrary port/s and where m≥1 and n≥2. Each port 1, 2, . . . , n can be operated as an input or an output port. Each of the ports 1, 2, . . . , n also has at least m phase legs 16 with multiple active switches 17, 19, where the example is a two-level converter with three phase legs. The ports can convert a DC voltage into an AC voltage and vice versa, where in standard operation the input port/s converts a DC input voltage $U_{in}$ into an AC input voltage and the output port/s convert an AC output voltage into a DC output voltage $U_{out}$. The ports 1, 2, . . . , n are connected via a m-phase transformer 25 or over separate m transformers 25 each connected to each of the m phase legs 16 of each of the n ports 1, 2, . . . , n to transfer power between the ports. The input port of the two-port active bridge (DAB) converter can be called a primary side 14, which has three phase legs A1, A2, A3 16 with an upper active switch 17 and a lower active switch 19 per phase leg 16. The output port of the DAB converter can be called secondary side 15, which has three phase legs B1, B2, B3 16 with an upper active switch 17 and a lower active switch 19 per phase leg 16. The potential nodes 11, 12, 13 on the phase legs of the primary side and 21, 22, 23 on the phase legs of the secondary side are connected with the transformer 25. A middle point of the DC link on the primary side 18 may also be included. A middle point of the DC link on the secondary side 28 may be included.

The three-phase DAB DC-DC converter of FIG. 1 includes two actively switched three-phase bridges linked by a three-phase transformer, typically connected in star-star (Y-Y) configuration. To operate under zero-voltage soft-switching (ZVS) conditions, snubber- or resonant-capacitors can be placed across the semiconductor devices. However, under partial load conditions the magnetic energy stored in the transformer inductance may not be sufficient to commutate fully the voltage of the capacitors. Hard-switching events also occur when the sign of the current has not reversed (e.g., is still freewheeling in the diode) prior to switching off the anti-parallel active turn-off device and turning on the other switch in the inverter phase leg. Actually, power semiconductor devices can be destroyed when the energy stored in the capacitors is dumped in them during turn-on. In other words, the current has to be lagging (e.g., inductive) for both bridges to enable zero-voltage switching (ZVS) operation.

Figure 2:
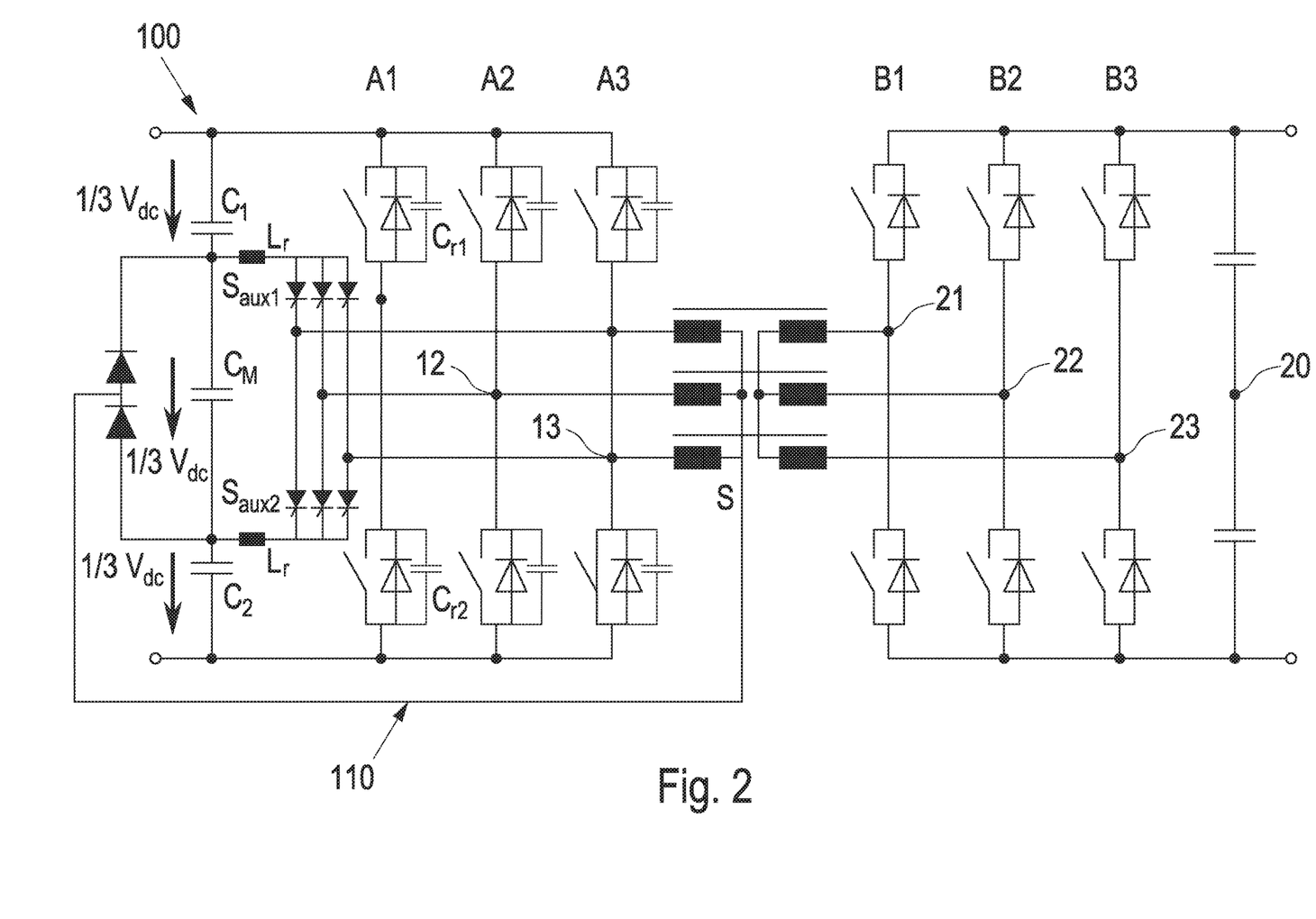
FIG. 2 shows a schematic view of electrical circuit comprising a three-phase DAB and an auxiliary circuit on one port according to the present invention.

FIG. 2 shows a schematic view of an electrical circuit including a DAB and an auxiliary circuit on one port (input port) according to the present invention. This electrical circuit is used to guarantee zero-voltage soft-switching without actively controlling the boost current. In the auxiliary circuit the transformer star point is connected to a single-phase diode rectifier of the auxiliary circuit, which produces a DC voltage of ⅓ $V_{DC}$=⅙ $V_{dc}$−(−⅙ $V_{DC}$) across the mid-point capacitor $C_M$ in the case of a three-phase DAB converter. As a result, the DC capacitors $C_1$, $C_M$ and $C_2$ each carry a voltage of ⅓$V_{DC}$. The auxiliary circuit is connected to the top and bottom terminals of $C_M$. Triggering the auxiliary switch $S_{aux1}$ while the lower diode D is conducting will turn off diode D. At this instance a resonant circuit is formed by the auxiliary inductance $L_{r1}$ and the parallel connection of the snubber capacitor $C_{r1}$ and $C_{r2}$ of the corresponding phase leg A1. Assuming no losses, the voltage across $C_{r2}$ will resonate to twice the voltage applied to the auxiliary inductor $L_r$, e.g., 2×⅔ $V_{DC}$. As soon as the voltage across the snubber capacitor $C_{r2}$ reaches $V_{DC}$ (e.g., when the voltage of $C_{r1}$ equals zero) the upper diode $D_1$ will clamp the voltage of the resonant circuit to the upper rail voltage. At this instance the resonant current in auxiliary inductance $L_r$ will linearly decrease to zero.

Similarly, when the current would become negative and freewheel through diode $D_1$, the auxiliary device $S_{aux2}$ needs to be turned on to force a commutation from the positive rail to the negative rail of the DC link.

The auxiliary currents will then discharge $C_M$. However, the current through the auxiliary rectifier diodes will charge $C_M$ back to one third of the DC link voltage $V_{DC}$. The current flowing from the star point S is determined by the zero-sequence impedance of the three-phase transformer. This impedance is in the order of a leakage inductance when the core of the transformer has the same number of transformer legs as the number of phases. In the example the transformer core would have three legs. In effect, this zero-sequence impedance is in series with the resonant inductor $L_r$. However, in case a three-phase, five-legged transformer core would be used the zero-sequence impedance is in the order of magnitude of the main magnetizing inductance of the transformer. Depending on the value of the transformer zero-sequence impedance, the converter switching frequency and the RMS value of the pulsed $C_M$ charging current, a series inductance between the star point and the rectifier to smoothen the current (to reduce losses in the transformer or to avoid saturation) can be added as an alternative embodiment of the invention.

As such the electrical circuit can also use inductors that are connected in a star arrangement instead of the zero-sequence impedance of the transformer. In this case the transformer does not provide the charging power of $C_M$ and has no extra losses occur in the transformer. The inductors can have separate cores or can be using a three-phase, three-legged core or a three-phase, five-legged core.

Figure 3:
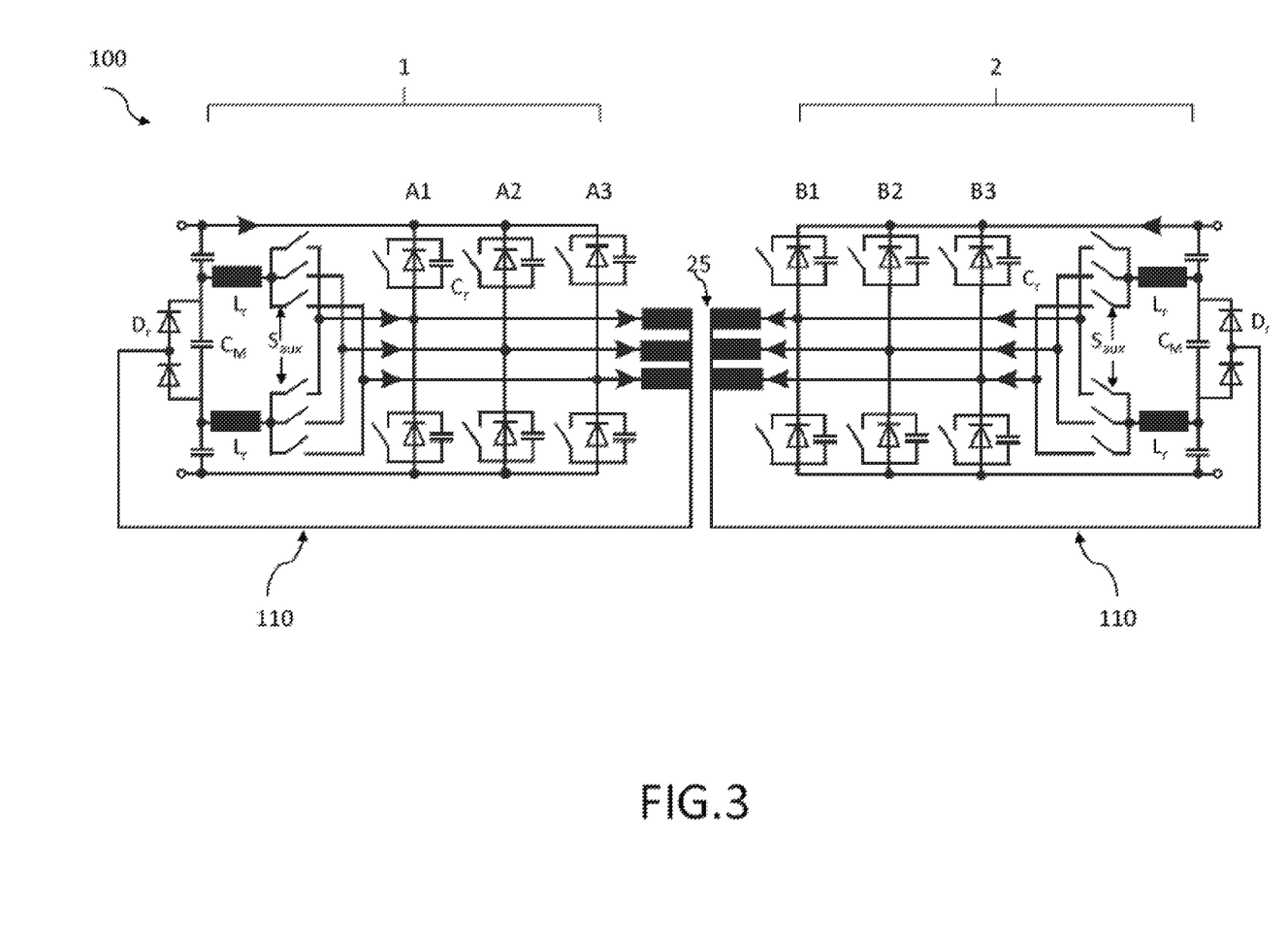
FIG. 3 shows a schematic view of electrical circuit comprising a DAB and an auxiliary circuit on each port according to the present invention.

FIG. 3 shows a schematic view of electrical circuit including a DAB and an auxiliary circuit on each port according to the present invention. The functionality of the circuit in FIG. 3 can be derived from the description of FIG. 2, only with both bridges equipped with the auxiliary circuit. This embodiment is preferable if the second port is also operating in hard-switching mode and/or has high loss switches.

Figure 4:
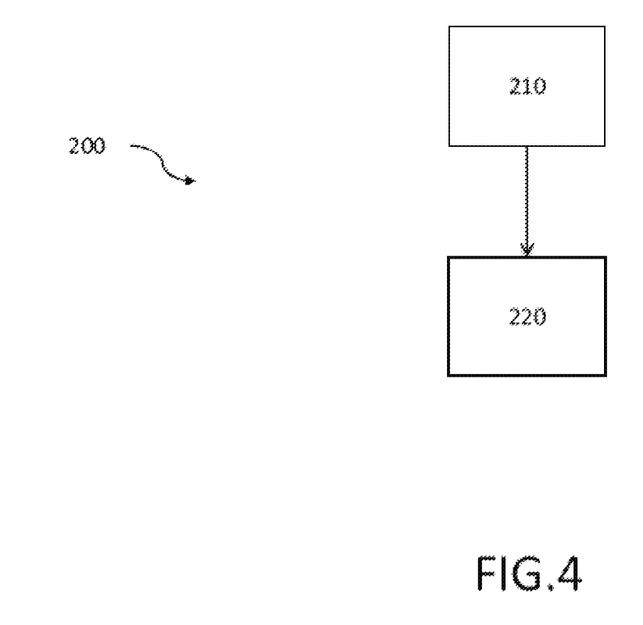
FIG. 4 shows an embodiment of the method according to the present invention.

FIG. 4 shows an embodiment of the method 200 of operating an electrical circuit 100 including an n-port m-phase active bridge converter 10 with n≥2 and m≥3, where each port 1, . . . , n can be operated as an input or an output port, wherein each of the n ports 1, . . . , n has three phase legs 16 with multiple active switches 17, 19 15 or resonant capacitors $C_r$, whereby the ports 1, . . . , n can convert a DC-voltage $U_{in}$, $U_{out}$ into an AC voltage and vice versa, whereby the ports 1, . . . , n are connected via a three-phase transformer 25 or over separate three transformers 25 each connected to each of the three phase legs 16 of each of the ports 1, . . . , n to transfer power between the ports 1, . . . , n, including the steps of feeding back 210 a fraction of a transformer input voltage into a mid-point capacitor $C_M$ of a DC-link of at least one of the ports 1, . . . , n of the n-port m-phase active bridge converter 10 via an auxiliary circuit 110 connected to a star point S of the transformers 25; and providing 220 zero-voltage soft-switching of the switches 17, 19 of the phase legs 16 at zero voltage under all load conditions.

While the invention has been illustrated and described in detail in the drawings and the foregoing description, such illustration and description are to be considered illustrative or exemplary and not restrictive.

From reading the present disclosure, other modifications will be apparent to persons skilled in the art. Such modifications may involve other features which are already known in the art and which may be used instead of or in addition to features already described herein.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality of elements or steps. The mere fact that certain measures are recited in mutually different dependent claims does not indicate that a combination of these measures cannot be used to advantage.

The invention claimed is:

1. An electrical circuit for zero-voltage switching of a DC-DC converter under all load conditions, comprising:
   an n-port m-phase active bridge converter with n≥2 and m≥3, where each of the n ports can be operated as an input or an output port,
   wherein each of the n ports has m phase legs with multiple active switches with parallel connected snubber capacitors,
   wherein the n ports can convert a DC-voltage into an AC voltage and vice versa,
   wherein each of then ports are connected via corresponding m-phase transformers, each m-phase transformer connected to phase legs of each of the n ports to transfer power between the n ports, and
   wherein an auxiliary circuit is connected to a star point of the n m-phase transformers to feed back a fraction of a transformer input voltage into a DC mid-point capacitor of a DC-link of the n-port m-phase active bridge converter in such a way that the DC mid-point capacitor is charged at a corresponding port of the n ports with an offset voltage above and below a DC-link midpoint voltage enabling the auxiliary circuit to provide under all load conditions zero-voltage soft-switching operation of the multiple active switches of the phase legs.

2. The electrical circuit according to claim 1, wherein the auxiliary circuit comprises one or more single-phase diode rectifiers and auxiliary inductances, two auxiliary switches per phase leg and one or more auxiliary capacitors, and
wherein the snubber capacitors and the auxiliary inductances form a resonant circuit when one auxiliary switch is turned on, which injects an additional current into the phase legs to provide zero-voltage soft-switching under all load conditions.

3. The electrical circuit according to claim 2, wherein the auxiliary switches are zero-current switching devices that are configured to turn on the auxiliary circuit.

4. The electrical circuit according to claim 1, wherein a number of phases m is 3.

5. The electrical circuit according to claim 1, wherein the n-port m-phase active bridge converter is a two-port m-phase active bridge converter.

6. The electrical circuit according to claim 4, wherein the n-port m-phase active bridge converter is a two-port three-phase active bridge converter.

7. The electrical circuit according to claim 1, wherein the fraction of the transformer input voltage fed back into the DC mid-point capacitor of the DC-link of any port of the n ports has a maximum value that is (m−2)/m of the DC voltage.

8. The electrical circuit according to claim 1, wherein each of the n ports is connected to the auxiliary circuit to feedback a fraction of a transformer voltage into each of the n ports.

9. The electrical circuit according to claim 1, wherein a number of phases m is larger than three.

10. The electrical circuit according to claim 1, wherein an auxiliary zero-current switching circuit is added to force commutate the snubber capacitors in the n-port m-phase active bridge converter.

11. The electrical circuit according to claim 6, wherein auxiliary inductors are placed behind auxiliary switches and the auxiliary inductors comprise 2 m separate inductors for the auxiliary circuit to spread losses in the auxiliary inductors and facilitate cooling.

12. A method of operating an electrical circuit comprising an n-port m-phase active bridge converter with n≥2 and m≥3, where each of n ports can be operated as an input or an output port, wherein each of the n ports has m phase legs with multiple active switches with parallel connected snubber capacitors, whereby the n ports can convert a DC-voltage into an AC voltage and vice versa, whereby the n ports are connected via an m-phase transformer and are each connected to each of the m phase legs of each of the n ports to transfer power between the n ports, the method comprising:
feeding back a fraction of a transformer input voltage into a mid-point capacitor of a DC-link of at least one of the n ports of the n-port m-phase active bridge converter via an auxiliary circuit connected to a star point of n m-phase transformers; and
providing zero-voltage soft-switching of the multiple active switches of the m phase legs at zero voltage under all load conditions.

13. The method according to claim 12, wherein a number of phases m is a number≥3.

14. The method according to claim 12, wherein the n-port m-phase active bridge converter is a two-port m-phase active bridge converter.

15. The method according to claim 12, wherein the n-port m-phase active bridge converter is a two-port three-phase active bridge converter.

* * * * *

UNITED STATES PATENT AND TRADEMARK OFFICE
CERTIFICATE OF CORRECTION

PATENT NO. : 10,873,254 B2
APPLICATION NO. : 16/456219
DATED : December 22, 2020
INVENTOR(S) : Rik W. De Doncker Page 1 of 1

It is certified that error appears in the above-identified patent and that said Letters Patent is hereby corrected as shown below:

In the Claims

Column 10, Line 58, Claim 1, delete "then" and insert -- the n --

Column 12, Line 29, Claim 13, delete "number$\geq$3." and insert -- number $\geq$3. --

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*